(12) United States Patent
Hassager et al.

(10) Patent No.: US 12,317,063 B2
(45) Date of Patent: May 27, 2025

(54) HEARING DEVICE

(71) Applicant: GN Audio A/S, Ballerup (DK)

(72) Inventors: Henrik Gert Hassager, Ballerup (DK); Søren Helstrup Kvist, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 207 days.

(21) Appl. No.: 18/055,186

(22) Filed: Nov. 14, 2022

(65) Prior Publication Data

US 2023/0209299 A1 Jun. 29, 2023

(30) Foreign Application Priority Data

Dec. 28, 2021 (EP) ..................................... 21217910

(51) Int. Cl.
 *H04S 7/00* (2006.01)
 *G01S 7/41* (2006.01)
 *G01S 13/02* (2006.01)
(52) U.S. Cl.
 CPC .............. *H04S 7/304* (2013.01); *G01S 7/412* (2013.01); *H04S 7/301* (2013.01); *G01S 2013/0245* (2013.01); *H04S 2420/01* (2013.01)
(58) Field of Classification Search
 None
 See application file for complete search history.

(56) References Cited

U.S. PATENT DOCUMENTS

| 9,030,545 | B2 | 5/2015 | Pedersen |
| 9,544,706 | B1 | 1/2017 | Hirst |
| 2017/0272890 | A1 | 9/2017 | Oh et al. |
| 2021/0278508 | A1* | 9/2021 | Caspers ................. G02F 1/292 |

FOREIGN PATENT DOCUMENTS

WO WO-2021194487 A1 * 9/2021

OTHER PUBLICATIONS

The extended European Search Report issued in European patent Application No. 21217910.5, dated Jun. 2, 2022.

* cited by examiner

*Primary Examiner* — Kenny H Truong
(74) *Attorney, Agent, or Firm* — HSML P. C.

(57) ABSTRACT

The present disclosure relates to a hearing device comprising a first radar sensor configured for obtaining first radar data indicative of a shape of a first pinna of the first ear of a user. A processing unit of the hearing device is configured to receive the first radar data from the first radar sensor, and determine, based on the first radar data, a shape of the first pinna.

13 Claims, 2 Drawing Sheets

HEARING DEVICE

TECHNICAL FIELD

The present disclosure relates to a hearing device, a hearing system and a method for determining a first pinna shape.

BACKGROUND

Hearing devices are used by a wide range of consumers, being it for hearing aids or consumer hearing devices such as earbuds or headset. Constantly, hearing devices are improved upon and further developed, one example being in the entertainment industry, where stereophonic and surround-sound systems may be used to provide a more immersive sound scape. In recent years, spatial audio has gathered an increased interest for enhancing the audio experience for consumers by attempting to create spatial sound reproduction systems (also called 3D audio, virtual auditory display, virtual auditory space, and virtual acoustic imaging systems) that can make audio playback seem to a consumer as though a given sound originates from a direction, regardless of whether there is actually a speaker situated in the position from which the sound seems to originate. Some approaches to achieving this use sophisticated sound wave modification methods, which may incorporate head-related transfer functions (HRTFs) to simulate spatial sound using a few speakers.

A head-related transfer function is a function that is meant to model the way in which an external ear transforms sounds (i.e., acoustic signals) heard by a human. Filtering using the HRTF enables artificial localization cues including interaural time difference (ITD) and frequency dependent interaural level difference (ILD) that auditory system uses to define a position of the sound event. The external ear, including the pinna, has transforming effects on sound waves that are perceived by the eardrum in humans. The external ear can, for example, act as a filter that reduces low frequencies, a resonator that enhances middle frequencies, and a directionally dependent filter at high frequencies that assists with spatial perception. Ideally, if an HRTF is accurate, the HRTF can be used by spatial sound reproduction systems to assist in creating the desired illusion that sound originates from a specific direction relative to a user.

However, spatial sound reproduction is not the only feature affected by the ear, the fit of the hearing device is also greatly decided by the external ear, and with almost every ear being unique finding the right fit of a hearing device is not necessarily an easy task. The fit of the hearing device is important for achieving both a high sound quality and user experience, as the fit of the hearing device may affect noise cancellation, occlusion, comfort, and etc.

Hence, correctly characterizing the external ear may offer a wide range of advantages to hearing devices.

U.S. Pat. No. 9,544,706 B1 discloses a technology for creating head-related transfer functions that are customized for a pinna of a human. The method may include capturing a plurality of digital images of a human pinna using a camera. The method may also include generating a 3D (three-dimensional) digital model of the human pinna using digital images. In addition, the method may also include determining a HRTF that is customized for the human pinna using the 3D digital model. The HRTF can be associated with a user profile and the user profile may include sound output customization information for a speaker arrangement capable of producing virtual surround sound. The customized HRTF may then be used by an application in association with a specific user profile to produce a virtual surround sound experience through headphones

SUMMARY

It is an object according to a first aspect of the present disclosure to provide an improved hearing device. According to the first aspect of the disclosure a hearing device is provided, comprising:

a first housing for being worn at and/or in a first ear of a user, and a processing unit configured to control functionality of the hearing device, characterized in that, the hearing device further comprises a first radar sensor configured for obtaining first radar data indicative of a first pinna of the first ear, and wherein the processing unit is further configured to receive the first radar data from the first radar sensor, and determine, based on the received first radar data, a shape of the first pinna.

Consequently, an improved hearing device is provided. The hearing device provides an improved way of determining a pinna shape. The determination of the pinna shape may facilitate an improved fit of the hearing device, e.g., choice of the correctly sized ear gel for the determined pinna shape. The determination of the pinna shape may facilitate an improved rendering of audio to be played back via the hearing device, e.g., improved spatialization of audio. Furthermore, the hearing device is not reliant on receiving data regarding the pinna from a sensor external to the hearing device in order to obtain data regarding the pinna.

Outputting the shape of the first pinna is to be interpreted broadly. Outputting the shape of the first may be understood as outputting the shape of the first pinna for use in further processing, e.g., in processing of an audio signal, or outputting the shape of the first pinna to another processor. Outputting may be understood as outputting the shape of the first pinna for display to the user, or alternatively another person than the user, e.g., an audiologist.

The hearing device is configured to be worn by a user. The hearing device may be arranged at the user's ear, on the user's ear, over the user's ear, in the user's ear, in the user's ear canal, behind the user's ear, and/or in the user's concha, i.e., the hearing device is configured to be worn at the user's ear.

The hearing device may be configured to be worn by a user at each ear, e.g., a pair of ear buds or a head set with two earcups. In the embodiment where the hearing device is to be worn at both ears, the components meant to be worn at each ear may be connected, such as wirelessly connected and/or connected by wires, and/or by a strap. The components meant to be worn at each ear may be substantially identical or differ from each other.

The hearing device may be a hearable such as a headset, headphones, earphones, ear bud, hearing aids, an over the counter (OTC) hearing device, a hearing protection device, a one-size-fits-all hearing device, a custom hearing device or another head-wearable hearing device.

The hearing device may be embodied in various housing styles or form factors. Some of these form factors are earbuds, on the ear headphones, or over the ear headphones. The person skilled in the art is aware of different kinds of hearing devices and of different options for arranging the hearing device in and/or at the ear of the hearing device wearer.

The hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into an electric input signal. The electric input signal may be an analogue signal. The electric input signal may be a digital signal. The one or more input transducer(s) may be coupled to one or more analogue-to-digital converter(s) configured for converting the analogue input signal into a digital input signal.

The hearing device may comprise one or more antenna(s) configured for wireless communication. The one or more antenna(s) may comprise an electric antenna. The electric antenna is configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna comprises a coil. The coil may be coiled around the magnetic core. The magnetic antenna is configured for wireless communication at a second frequency. The second frequency may be below 100 MHZ. The second frequency may be between 9 MHZ and 15 MHZ.

The hearing device may comprise one or more wireless communication unit(s). The one or more wireless communication unit(s) may comprise one or more wireless receiver(s), one or more wireless transmitter(s), one or more transmitter-receiver pair(s), and/or one or more transceiver(s). At least one of the one or more wireless communication unit(s) may be coupled to the one or more antenna(s). The wireless communication unit may be configured for converting a wireless signal received by at least one of the one or more antenna(s) into an electric input signal. The hearing device may be configured for wired/wireless audio communication, e.g., enabling the user to listen to media, such as music or radio, and/or enabling the user to perform phone calls.

A wireless signal may originate from external source(s), such as spouse microphone device(s), wireless audio transmitter, a smart computer, and/or a distributed microphone array associated with a wireless transmitter.

The hearing device may be configured for wireless communication with one or more external devices, such as one or more accessory devices, such as a smartphone and/or a smart watch.

The hearing device includes a processing unit. The processing unit may be configured for processing one or more input signals. The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment, face balancing and/or processing of user input. The processing unit may be a processor, an integrated circuit, an application, functional module, etc. The processing unit may be implemented in a signal-processing chip or a printed circuit board (PCB). The processing unit is configured to provide an electric output signal based on the processing of one or more input signals. The processing unit may be configured to provide one or more further electric output signals. The one or more further electric output signals may be based on the processing of one or more input signals. The processing unit may comprise a receiver, a transmitter and/or a transceiver for receiving and transmitting wireless signals. The processing unit may control one or more playback features of the hearing device.

The hearing device comprises an output transducer. The output transducer may be coupled to the processing unit. The output transducer may be a loudspeaker, or any other device configured for converting an electrical signal into an acoustical signal. The receiver may be configured for converting an electric output signal into an acoustic output signal.

The wireless communication unit may be configured for converting an electric output signal into a wireless output signal. The wireless output signal may comprise synchronization data. The wireless communication unit may be configured for transmitting the wireless output signal via at least one of the one or more antennas.

The hearing device may comprise a digital-to-analogue converter configured to convert an electric output signal or a wireless output signal into an analogue signal.

The hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The hearing device may comprise a memory, including volatile and non-volatile forms of memory.

The determined pinna shape may be in the form of a 3D replica of the pinna, e.g., by a plurality of measurements which may form a point cloud. The determined pinna shape may be a category of a pinna, e.g., the processing unit may be configured to determine the pinna shape by classifying the pinna shape according to a pinna category. The pinna category may be based on previous measurements of pinnae from which categories are formed. The categories may for example be formed by clustering of the previous pinna measurements, the different clusters may then each represent a pinna category. A neural network may be trained on the previous pinna measurements and configured to categorize the determined pinna shape. The determined pinna shape may be one or more measures of the pinna, e.g., a width, depth or height of the tragus, concha, and/or helix. The determined pinna shape may be one or more measures which gives information regarding a form and/or size of the pinna.

The first radar sensor may be any sensor capable of emitting an electromagnetic wave and converting the echo signal from the emitted electromagnetic wave into an electrical signal. The first radar sensor may emit radio waves. The first radar sensor may emit laser light, e.g., the radar sensor being a Lidar sensor. The first radar sensor may comprise a transmitting antenna and a receiving antenna, in some embodiments the transmitting antenna and the receiving antenna is the same antenna. The first radar sensor may be wired or wirelessly connected to the processing unit to allow for data obtained by the radar sensor to be transmitted to the processing unit.

Preferably, the first radar sensor is arranged on or near an outer surface of the first housing of the hearing device. Arranged near the outer surface may be understood as within 0-10 mm of the outer surface. By arranging the first radar sensor on or near the outer surface it may minimize blockage of the signal emitted by the radar sensor. The first radar sensor may be arranged on or near an outer surface of the first housing of the hearing device facing a torso of the user, when the hearing device is being worn by the user. The first radar sensor may be arranged facing toward the torso when the hearing device is worn by the user, e.g., if the hearing device is a headset comprising an ear cup the first radar sensor may be arranged on a lower part of the ear cup which faces towards the torso of the user when the headset is worn by the user. The first radar sensor may be arranged facing toward the first ear of the user when the hearing device is worn by the user, e.g., if the hearing device is a headset comprising an ear cup the first radar sensor may be arranged on an inner part of the ear cup which faces towards the ear of the user when the headset is worn by the user. The first radar sensor may be connected to the first housing of the hearing device.

The first radar data may be contained in an electrical signal generated by the first radar sensor based on a received echo signal. The first radar sensor may be configured to transmit the electrical signal containing the first radar data to the processing unit by a wired or wireless connection. The first radar data is indicative of a first pinna shape, i.e., the first pinna shape may be read directly from the radar data, or it may require additional processing of the first radar data to determine the first pinna shape.

In the context of this disclosure the term first pinna shape is interchangeable with the terms shape of the first pinna or the determined first pinna shape.

In an embodiment the first radar data comprises data indicative of one or more of the following size of the head of the user, size of the first ear, size of the ear canal of the first ear, shape of the head of the user, shape of the first ear, shape of the ear canal of the first ear, an orientation of the head of the user, an orientation of the torso of the user, a size of the torso of the user, and a shape of the torso of the user.

The processing unit may comprise a memory. Alternatively, the processing unit may be communicatively connected to the memory. The memory may store previously obtained radar data. The memory may store a library of measurements relating radar data to pinna shapes. The processing unit may be configured to determine the first pinna shape based on a comparison between the first radar data and the library storing measurements relating radar data to first pinna shapes.

The processing unit may comprise a machine learning model trained to determine a first pinna shape based on radar data. The machine learning model may be trained by supervised learning with a labelled training data set. The machine learning model may be trained by semi-supervised learning with a training data set comprising both labelled and unlabeled data. The machine learning model may be trained by non-supervised learning with a training data set comprising only unlabeled data. The training data set may have been achieved in a lab setting, by providing one or more mannequins and/or one or more users with a hearing device provided with a radar sensor and then also measuring the pinna shape by other means, e.g., by scanning, imaging, measuring by ruler or other similar means and then correlating the measured pinna shapes with radar data received from the radar sensor. The machine learning model may be an off-line trained neural network. The neural network may comprise one or more input layers, one or more intermediate layers, and/or one or more output layers. The one or more input layers of the neural network may receive the radar data as the input. The machine learning model may be a neural network. The machine learning model may be trained to receive radar data as input and outputting a pinna shape, a pinna related transfer function, and/or a head related transfer function corresponding to the received radar data. In some embodiments the machine learning model may be trained to receive radar data as input and outputting a pinna related transfer function corresponding to the received radar data. The machine learning model may be stored in memory of the hearing device. The machine learning model may be a deep neural network. The deep neural network may be a recurrent neural network (e.g., one to one, one to many, many to one, many to many). The deep neural network may be a convolutional neural network. The deep neural network may be a Region-Based Convolutional Neural Network. The deep neural network may be a gaussian mixture model. The deep neural network may be a regression model. The deep neural network may be a linear factorization model. The deep neural network may be a kernel regression model. The deep neural network may be a Non-Negative Matrix Factorization model.

Alternatively, the processing unit may determine the first pinna shape by transmitting the first radar data to an external processing unit. The external processing unit may be configured to process the first radar data to determine the first pinna shape. In another embodiment, the processing unit may be configured to determine the first pinna shape by directly reading the first pinna shape from the first radar data.

The processing unit may be arranged in or otherwise connected to the first housing of the hearing device. In an embodiment the processing unit is further configured to compare the received first radar data with a prerecorded library of pinna shapes, and based on the comparison, determine a shape of the first pinna.

Hence, an efficient way of determining a pinna shape is achieved, which is not reliant on a large amount of processing power.

The prerecorded library may be stored on a memory of the hearing device, or a memory comprised by the processing unit. A prerecorded library storing measurements relating radar data to pinna shapes may be achieved in a corresponding manner as the above explained training data set. The prerecorded library of pinna shapes may comprise a range of pinna shapes measured in a lab setting. The prerecorded library of pinna shapes may comprise one or more pinna shapes associated with one or more users of the hearing device. The one or more pinna shapes associated with one or more users of the hearing device may be measured previously by the first radar sensor. The one or more pinna shapes associated with one or more users of the hearing device may be received by the processing unit as inputs to the prerecorded library of pinna shapes.

The comparison may be to measure a similarity between the measured first pinna and the pinna shapes in the prerecorded library. The processing unit may then determine a first pinna shape based on the measure for similarity, e.g., choosing the pinna shape in the prerecorded library with the highest similarity measurement. The similarity measurement may be based on a size or form of one or more characteristics of the first pinna, e.g., size or shape of the concha, helix, tragus lobule, etc.

In an embodiment the processing unit is further configured to perform a calibration process, based on the determined shape of the first pinna.

Hence, a more personalized set-up of the hearing device may be achieved since the hearing device may be calibrated to suit the pinna shape of the user.

The calibration may be to adjust one or more audio settings of the hearing device, e.g., bass, treble, etc. The calibration may be to provide instructions regarding a fit of the hearing device, e.g., the processing unit may prompt the user to change to a more suitable ear gel size or prompt the user to change the wear style of the hearing device. The processing unit may provide instructions to the user by playback of an instruction via one or more speakers comprised by the hearing device. The processing unit may provide instructions to the user by sending a control signal to an external device comprising a speaker and/or display, the control signal being configured to control a functionality of the speaker and/or display of the external device. The calibration may be to select a specific user profile, e.g., the processing unit may determine the pinna to be belonging to a specific user via a comparison of the first radar data to a prerecorded library of pinna shapes comprising one or more pinna shapes associated with one or more users of the hearing device. The user profile may comprise one or more selected settings for playback of audio. The calibration may be to switch a mode of operation of the hearing device. Each mode may be characterized by restricting or enabling different functionalities of the hearing device. The hearing device may be in a locked mode, where one or more functionalities of the hearing device is restricted by the processing unit, e.g., playback of audio via the hearing device is limited or non-possible. The hearing device may be in an unlocked mode, wherein one or more functionalities of the hearing device is allowed by the processing unit, e.g., playback of audio via the hearing device is not limited. The calibration may be to go from a locked mode to an unlocked mode. The processing unit may be configured to from the locked mode to the unlocked mode, in response to determining the determined first pinna shape belongs to a user of the hearing device. The pinna of the user of the hearing device may be stored in a prerecorded library of pinna shapes. The calibration process may be performed in conjunction with an external processing unit.

In an embodiment the first radar sensor is configured to emit a radio signal at a frequency of 40 GHz-120 GHz, preferably 50 GHz-100 GHz, and even more preferred 55 GHz-65 GHz.

Having the first radar sensor emit radio signal at a frequency in the range of 40 GHz-120 GHz allows the first radar sensor to achieve a high enough resolution to correctly capture a target of interest, i.e., a further body part of the user.

In an embodiment the first radar sensor comprises a phased array.

Having a first array allows for beam steering of the radio signal emitted by the first radar sensor. A phased array may further decrease the first radar sensors reliance on correct positioning on the hearing device as the beam steering allows for one to compensate for misalignments or mispositioning of hearing device. Furthermore, a phased array may achieve a higher signal to noise ratio as compared to traditional fixed phased arrays. The phased array may be set with a fixed directionality, or the external processing unit may be configured to control a directionality of the phased array.

In an embodiment the phased array comprises at least four antennas.

The applicant has found a phased array comprising four antennas sufficient to detect an orientation of a head of the user relative to a further body part of the user. In hearing devices space may be severely limited, hence limiting the amount of space required for the first radar sensor may be necessary. Thus, by having a phased array with four antennas a compact first radar sensor may be achieved.

In an embodiment the external processing unit is further configured to control a phase relation of antennas within the phased array to perform a scan of a user wearing the hearing device.

In an embodiment the processing unit is further configured to, based on the determined first pinna shape, determine a pinna-related transfer function, PRTF, for the first ear.

The determined PRTF may be used for processing of received audio, or the determined PRTF may be transmitted to an external processing unit which may process audio based on the determined PRTF. The determined PRTF may be used for selecting one or more filters for processing an audio signal by the processing unit or by an external processing unit. The determined PRTF may facilitate the rendering of a 3D audio signal.

The PRTF may be determined by comparing the determined first pinna shape to a PRTF database storing a plurality of relations between PRTFs and determined first pinna shapes. Alternatively, the PRTF may be determined by inputting the determined pinna shape into a parametric formula for the PRTF.

In an embodiment the hearing device further comprises an orientation sensor configured for obtaining orientation data regarding a head orientation of the user, wherein the processing unit is further configured to receive orientation data from orientation sensor, based on the received orientation data, determine a head orientation of the user, and based on the determined PRTF and the determined head orientation, determine a head related transfer function, HRTF.

The determined HRTF may be used for processing of received audio, or the determined HRTF may be transmitted to an external processing unit which may process audio based on the determined HRTF. The determined HRTF may be used for selecting one or more filters for processing an audio signal by the processing unit or by an external processing unit.

The HRTF may be determined by comparing the determined PRTF and the determined head orientation to a database storing a plurality of associations between HRTFs and head orientations and determined PRTFs. Alternatively, the HRTF may be determined by inputting the determined PRTF and the determined head orientation into a parametric formula for the HRTF.

In an embodiment the processing unit is further configured to receive an audio signal and process the received audio signal based on the determined shape of the first pinna.

Processing if the audio signal is explained more in-depth in relation to the second aspect of the disclosure. In the second aspect of the disclosure, it is described that audio processing is performed by an external processing unit, however, the processing steps performed by the external processing unit may as well be performed by the processing unit in the hearing device. However, to avoid redundancy further explanation of the audio processing has been kept to the second aspect, although it is equally applicable to the first aspect and may as well be performed by the processing unit of the hearing device.

The processing unit may receive an audio signal from a device external to processing unit, e.g., a smart device, a computer, a phone, or other electronic devices. The processing unit may be configured to communicate with an external device over a short-range wireless network such as a Bluetooth network, a near field magnetic inductance network, or similar. The processing unit may be configured to communicate with an external device over a long-range wireless network such as a mobile network, a Wi-Fi network, or similar.

In an embodiment the hearing device further comprises a second housing a second housing for being worn at and/or in a second ear of a user, and a second radar sensor connected to the second housing and configured for obtaining second radar data indicative of a second pinna of the second ear, and wherein the processing unit is further configured to receive the second radar data from the second radar sensor, and determine, based on the received second radar data, a shape of the second pinna.

Consequently, differences in the pinna shapes between the ears of a user may be accounted for. Most pinna shapes are unique, even for the same person the pinnae of the person may differ by quite a large margin from each other. Hence, by measuring both pinnae differences between the pinnae may be accounted for.

Processing performed in relation to the determined first pinna shape may equally be applicable to the determined second pinna shape, e.g., processing of audio or processing regarding fitting of the hearing device may be carried out based on both the determined first pinna shape and the determined second pinna shape.

The second housing may be substantially identical to the first housing. The second housing may differ from the first housing, e.g., the first housing may have a first radar sensor connected to it whereas the second housing may be provided without a radar sensor connected to it. A processing unit may be connected to or arranged in the second housing, alternatively, sensors associated with the second housing, e.g., a radar sensor and an orientation sensor, may be configured to transmit sensor data to a processing unit external to the second housing, e.g., a processing unit associated with the first housing.

In an embodiment the hearing device is a headset, one or more earbuds, or a hearing aid.

According to a second aspect of the disclosure a hearing system is provided, comprising:

A hearing device, comprising a first housing for being worn at and/or in a first ear of a user, and
    a processing unit configured to control functionality of the hearing device, characterized in that, the hearing device further comprises a first radar sensor configured for obtaining first radar data of a first pinna of the first ear, and wherein the processing unit is further configured to receive the first radar data from the first radar sensor, an external processing unit, wherein the external processing unit is configured to receive the first radar from the processing unit, and determine, based on the first radar data, a first pinna shape.

Consequently, a hearing system is provided which may provide an improved user experience. The hearing system may process received audio signals, based on the determined first pinna shape to facilitate the creation of more user customized audio signals, and/or to allow for improved spatialization of the audio signal. Furthermore, the hearing system may provide feedback to the user of the hearing device regarding a fit of the hearing device, based on the determined first pinna shape.

The external processing unit may be configured to determine the first pinna shape based on the first radar data. Alternatively, the first pinna shape is determined by the processing unit in the hearing device, and subsequently transmitted to the external processing unit which may then determine the first pinna shape from the received signal from the processing unit.

The external processing unit may receive an audio signal from a device external to the external processing unit, e.g., a smart device, a computer, a phone, or other electronic devices. The external processing unit may be configured to communicate with an external device and/or the processing unit over a short-range wireless network such as a Bluetooth network, a near field magnetic inductance network, or similar. The external processing unit may be configured to communicate with an external device and/or the processing unit over a long-range wireless network such as a mobile network, a Wi-Fi network, or similar. The external processing unit may receive an audio signal from a memory associated with the processing unit. The external processing unit may receive an audio signal from the processing unit. The external processing unit may be a component in a smart device, a computer, a phone, or other electronic devices. The external processing unit may be comprised by an audio renderer.

In an embodiment the external processing unit is configured to receive an audio signal, process the received audio signal based on the determined first pinna shape, and transmit the processed audio signal to the processing unit.

An audio signal is in the context of this disclosure to be interpreted broadly. An audio signal may be any signal which describes or is indicative of a sound wave or otherwise coding for a sound. For example, an audio signal may be an electrical signal which may be converted by a speaker to a soundwave. An audio signal may also be a sound wave, e.g., a sound wave incident on a microphone which may then be converted to an electrical signal. When stating the external processing unit is configured to receive an audio signal it may be understood as the external processing unit being configured to receive an electrical signal coding for a soundwave. An audio signal may be a 3D audio signal. An audio signal may be a stereo audio signal.

Processing of the received audio signal, based on the determined first pinna shape, may be carried out in a plethora of ways. The audio signal may be a stereo signal configured to be played back over two channels, e.g., a right channel and a left channel. The hearing device may comprise a right speaker associated with the right channel and left speaker associated with the left channel. The external processing unit may then control a gain of the stereo signal in accordance with the determined first pinna shape and/or the determined second pinna shape. For example, the first pinna shape may be determined to enhance high frequency sounds, thus a decrease in gain for high frequency sounds may be optimal. Alternatively, the first pinna shape may be determined to enhance high frequency sounds, while the second pinna shape does not or at least not to the same extent as the first pinna shape, thus an increase in gain for high frequency sounds for a channel associated with the second ear may be optimal.

The external processing unit may be a spatial audio processor configured to receive an audio signal and spatially process the received audio signal, based on the first pinna shape. The external processing unit may be configured to determine a first filter, based on the first pinna shape, and apply the first filter to the received audio signal to generate a first output signal. The first filter may be a pinna filter. The external processing unit may further be configured to send the processed audio signal to the processing unit of the hearing device. The external processing unit and/or the processing unit may be provided with a receiver, a transmitter, and/or a transceiver for sending and receiving wireless and/or wired signals.

In an embodiment the hearing system the external processing unit is further configured to, based on the determined first pinna shape, render the received audio signal into a 3D audio signal.

A 3D audio signal is in the context of this disclosure to be understood as an audio signal comprising sound sources which has been virtually placed in a three-dimensional space around the user, thus giving the illusion to a user that sound is emanating from a point in space around the user, e.g., in front of the user, behind the user, besides the user, etc. Alternatively, a 3D audio signal may be understood as an audio signal which may be rendered into a spatialized audio signal, which when played back through a speaker comprises sound sources virtually placed in a three-dimensional space around the user. A 3D audio signal may comprise a binaural audio signal and spatial metadata. A 3D audio signal may comprise a binaural audio signal.

Rendering of the 3D audio signal may comprise applying one or more spatial filters, e.g., HRTF PRTF filters. The filters may be determined based on the determined pinna shape.

In an embodiment the hearing device further comprises an orientation sensor configured for obtaining orientation data regarding a head orientation of the user, and wherein the external processing unit is further configured to receive the orientation data from the hearing device, determine a head orientation based on the received orientation data, receive a 3D audio signal, based on the determined head orientation and the first pinna shape, spatially process the 3D audio signal.

The external processing unit may be configured to process a received audio signal by applying one or more HRTF filters, based on the head orientation and the first pinna. Alternatively, the external processing unit may be configured to process a received audio signal by applying one or more HRTF filters, based on the first pinna shape and the first head orientation. The external processing unit may comprise a HRTF database correlating different first pinna shapes and head orientations to one or more HRTF filters, HRTF filter parameters, and/or HRTFs. In such embodiments the HRTF database may comprise several HRTF databases. In such implementations each database contains filters for a specific combination of pinna shapes and head orientations. Alternatively, the HRTF may be generated by a parametric model receiving as input the first pinna shape and determined head orientations.

The external processing unit may be configured to determine a head filter, based on the head orientation, determine a pinna filter, based on the first pinna shape, and to process the received audio signal by applying the head filter and the torso filter to the audio signal.

The head filter and the pinna filter may be considered as subcomponents of a HRTF filter.

In the above in relation to the second aspect, the disclosure has been described as a system comprising an external processing unit performing audio processing based on sensor data received from the processing unit in the hearing device, however, in other embodiments processing of audio signals as described in relation to the external processing unit may be performed fully or at least partly by the processing unit in the hearing device. Having processing of the audio signal performed by the processing unit in the hearing device may reduce a latency of the processing as it obviates the need for transmitting sensor data from the processing unit to the external processing unit. The reason for performing processing of audio signal on the external processing unit may be caused by lack of processing power in the processing unit of the hearing device. In some embodiments part of the rendering of the 3D audio signal may be performed by the external processing unit and the processing unit may further process the audio signal received from the external processing unit, based on the first pinna shape, an example of a similar set-up is described in WO 2017/223110 A1 which discloses a system and method of modifying a binaural signal using headtracking information. The system calculates a delay, a first filter response, and a second filter response, and applies these to the left and right components of the binaural signal according to the headtracking information. The system may also apply headtracking to parametric binaural signals. In this manner, headtracking may be applied to pre-rendered binaural audio.

According to a third aspect of the disclosure a method for determining a pinna shape of a user, the method comprises the steps of receiving first radar data from a first radar sensor connected to a first housing worn at and/or in a first ear of the user, wherein the first radar data is indicative of a shape of a first pinna of the first ear, and determine, based on the received first radar data, a shape of the first pinna.

The method may be a computer implemented method.

An advantage described in conjunction with a particular embodiment is not necessarily limited to that embodiment or aspect and can be practiced in any other embodiments even if not so explicitly described.

Within this document, the singular forms "a", "an", and "the" specify the presence of a respective entity, such as a feature, an operation, an element, or a component, but do not preclude the presence or addition of further entities. Likewise, the words "have", "include" and "comprise" specify the presence of respective entities, but do not preclude the presence or addition of further entities. The term "and/or" specifies the presence of one or more of the associated entities.

BRIEF DESCRIPTION OF THE DRAWINGS

The disclosure will be explained in more detail below together with preferred embodiments and with reference to the drawings in which.

The figures are schematic and simplified for clarity, and they just show details essential to understanding the disclosure, while other details may be left out. Where practical, like reference numerals and/or labels are used for identical or corresponding parts.

DETAILED DESCRIPTION OF THE DRAWINGS

The detailed description given herein and the specific examples indicating embodiments of the disclosure are intended to enable a person skilled in the art to practice the disclosure and should thus be regarded as an illustration of the disclosure. The person skilled in the art will be able to readily contemplate further applications of the present disclosure as well as advantageous changes and modifications from this description without deviating from the scope of the disclosure. Any such changes or modifications mentioned herein are meant to be non-limiting for the scope of the disclosure. An advantage described in conjunction with a particular embodiment is not necessarily limited to that embodiment and can be practiced in any other embodiments even if not so illustrated, or if not so explicitly described.

Figure 1:
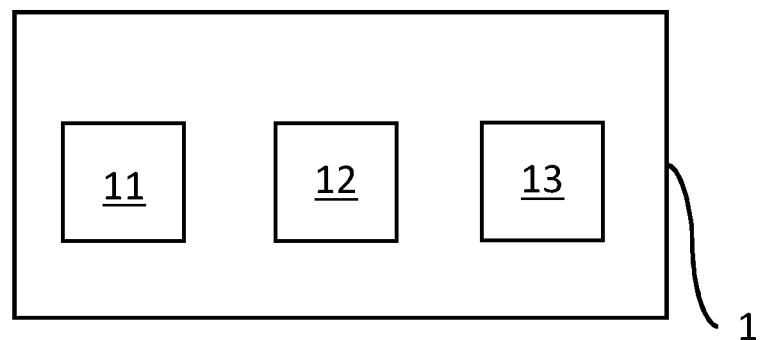
FIG. 1 shows a box diagram of a hearing device according to an embodiment of the disclosure.

Referring initially to FIG. 1 showing a box diagram of a hearing device 1 according to an embodiment of the disclosure. The hearing device 1 comprises a first housing 11 for being worn at and/or in a first ear of a user. The first housing 11 may comprise attachment means for attaching the hearing device at and/or in the first ear of the user. The first housing 11 may be an earcup, an earbud housing or similar. The hearing device 1 comprises a processing unit 12. The processing unit 12 is configured to control functionality of the hearing device 1. Functionality may comprise processing of a received audio signal, control of playback of an audio signal, a shutdown function of the hearing device, or other features of the hearing device 1. The hearing device 1 further comprises a first radar sensor 13 configured for obtaining first radar data indicative of a shape of a first pinna of the user. The processing unit 12 is configured to receive the first radar data from the first radar sensor 13, and, based on the first radar data, to determine the shape of the first pinna of the user.

Figure 2:
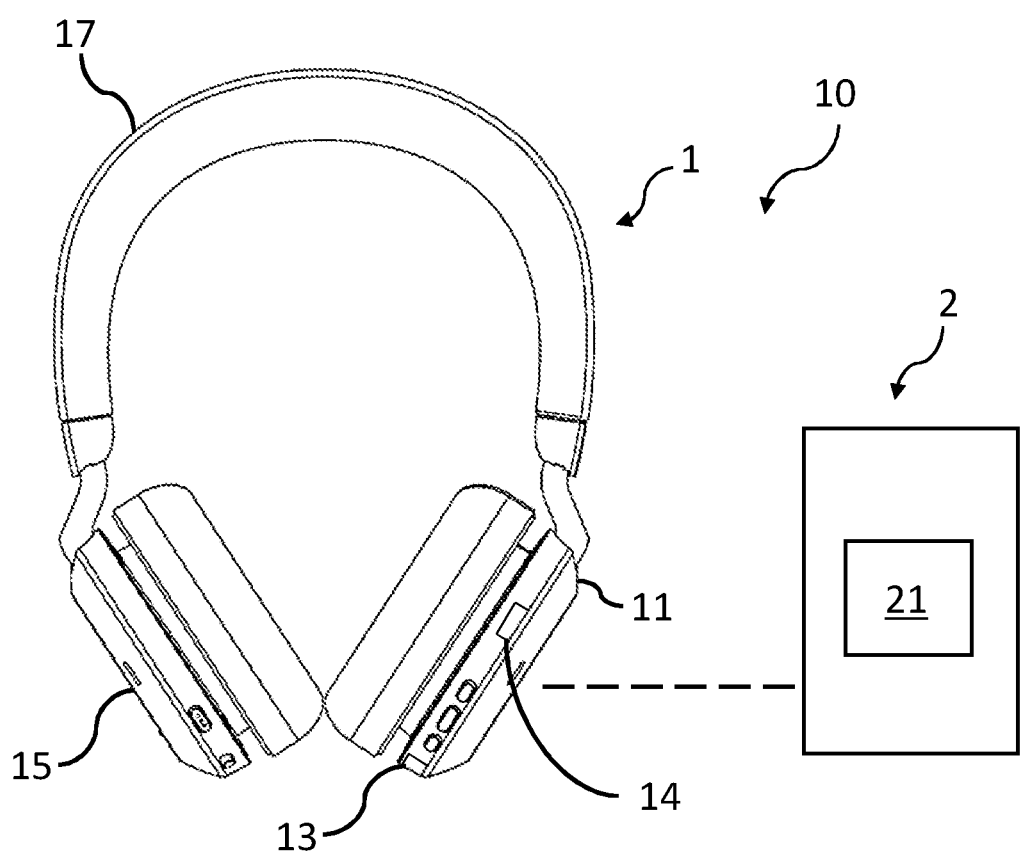
FIG. 2 shows a schematic drawing of a hearing system according to an embodiment of the disclosure.

Referring to FIG. 2 showing a schematic drawing of a hearing system 10 according to an embodiment of the disclosure. The hearing system 10 comprises a hearing device 1 communicatively connected to an external processing unit 21, either through a wired or a wireless connection. The external processing unit 21 is arranged within an external device 2, such as a mobile, a computer, or a smart device. The hearing device 1 is provided as a headset 1. The headset comprises a first earcup 11 and a second earcup 15. The earcups 11 and 15 are connected via a head strap 17. The earcups 11 and 15 are configured to be arranged on ears of a user. Connected to the first earcup 11 is a first radar sensor 13. In other embodiments a second radar sensor may be connected to the second earcup 15. In yet other embodiments the sensor 13 is connected to the head strap 17 of the hearing device 1. The external processing unit 21 is configured to receive an audio signal. The audio signal may be received by the external processing unit 21 via a cellular network, a wired network, or other kinds of wireless networks. The external processing unit 21 is configured to receive the first radar data from the processing unit 12, determine, based on the first radar data, a first pinna shape, and process the received audio signal based on the determined first pinna shape. The external processing unit 21 may further be configured to determine a pinna related transfer function, PRTF, based on the first pinna shape. The hearing device 1 further comprises an orientation sensor 14 configured for obtaining orientation data regarding a head orientation of the user.

Figure 3:
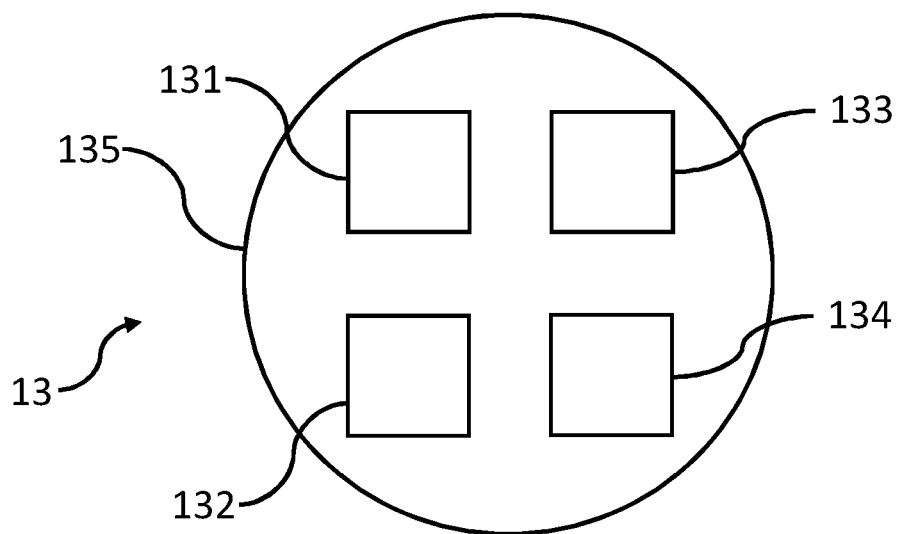
FIG. 3 shows a schematic top view of a radar sensor according to an embodiment of the disclosure.

Referring to FIG. 3 showing a schematic top view of a radar sensor 13 according to an embodiment of the disclosure. The radar sensor 13 comprises a substrate 135. The substrate 135 is depicted as being substantially circular when viewed from the top, however, the substrate 135 is not limited to a circular shape but may assume any shape appropriate and may be formed with a complementary shape to a hearing device 1 or a hearing device housing 11 and 15. Arranged on the substrate 135 are four antennas 131, 132, 133, and 134. The antennas 131, 132, 133, and 134 are configured to emit a radio signal at a frequency of 40 GHz-120 GHz, preferably 50 GHz-100 GHz, and even more preferred 55 GHz-65 GHz. The antennas 131, 132, 133, and 134 arranged on the substrate 135 form a phased array. The processing unit 12 of the hearing device 1 is configured to control a phase relation of the antennas 131, 132, 133, and 134 in the phased array to perform a scan of a user wearing the hearing device 1. The antennas 131, 132, 133, and 134 are arranged in a quadratic grid. Having the antennas 131, 132, 133, and 134 in a quadratic grid may facilitate control of the beam form generated by the antennas 131, 132, 133, and 134.

Figure 4:
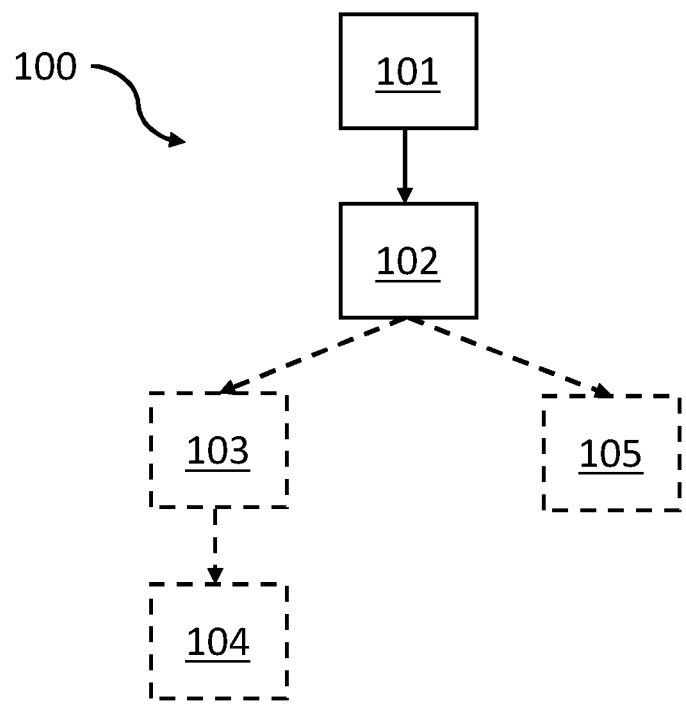
FIG. 4 shows a flow diagram of a method according to an embodiment of the disclosure.

Referring to FIG. 4 showing a flow diagram of a method 100 according to an embodiment of the disclosure. The method 100 may be a computer implemented method. The method 100 being for determining a first pinna shape. In a first step the method comprises receiving 101 first radar data from a first radar sensor 13, where the first radar data is indicative of a first pinna shape. In a second step the method comprises determining 102, based on the received first radar data, the first pinna shape. In a third step the method may comprise receiving 103 an audio signal. The audio signal may be received from an external source, e.g., a smart device or a computer. The audio signal may be a biaural audio signal, a stereo audio signal, a mono audio signal. The audio signal may comprise meta data to facilitate processing of the audio signal. In a fourth step the method may comprise processing 104 the received audio signal based on the determined first pinna shape. In a fifth step the method may comprise calibrating 105 the hearing device 1, based on the determined pinna shape.

The disclosure is not limited to the embodiments disclosed herein, and the disclosure may be embodied in other ways within the subject matter defined in the following claims. As an example, further features of the described embodiments may be combined arbitrarily, e.g., to adapt devices according to the disclosure to specific requirements.

Any reference numerals and labels in the claims are intended to be non-limiting for the scope of the claims.

The invention claimed is:

1. A hearing device, comprising:
a first housing configured to be worn at and/or in a first ear of a user;
a processing unit configured to control functionality of the hearing device;
a first radar sensor configured to emit electromagnetic waves to obtain first radar data indicative of a shape of a first pinna of the first ear,
wherein the first radar sensor comprises a phased array, and
wherein the processing unit is further configured to:
receive the first radar data from the first radar sensor,
determine, based on the received first radar data, a shape of the first pinna,
output the shape of the first pinna, and
control a phase relation of antennas within the phased array to scan a user wearing the hearing device.

2. A hearing device according to claim 1, wherein the processing unit is further configured to:
compare the received first radar data with a prerecorded library of pinna shapes, and
based on the comparison, determine the shape of the first pinna.

3. A hearing device according to claim 1, wherein the processing unit is further configured to:
perform a calibration process, based on the determined shape of the first pinna.

4. A hearing device according to claim 1, wherein the phased array comprises at least four antennas.

5. A hearing device, comprising:
a first housing configured to be worn at and/or in a first ear of a user;
a processing unit configured to control functionality of the hearing device;

a first radar sensor configured to emit electromagnetic waves to obtain first radar data indicative of a shape of a first pinna of the first ear, and wherein the processing unit is further configured to:
receive the first radar data from the first radar sensor,
determine, based on the received first radar data, a shape of the first pinna,
output the shape of the first pinna, and
based on the determined shape of the first pinna, determine a pinna related transfer function, PRTF, for the first ear,
receive orientation data from the orientation sensor,
based on the received orientation data, determine a head orientation of the user, and
based on the determined PRTF and the determined head orientation, determine a head related transfer function, HRTF.

6. A hearing device according to claim 1, wherein the processing unit is further configured to:
receive an audio signal, and
process the received audio signal based on the determined shape of the first pinna.

7. A hearing device according to claim 1,
wherein the hearing device further comprises:
a second housing configured to be worn at and/or in a second ear of a user, and
a second radar sensor connected to the second housing and configured to obtain second radar data indicative of a second pinna of the second ear, and
wherein the processing unit is further configured to:
receive the second radar data from the second radar sensor, and
determine, based on the received second radar data, a shape of the second pinna.

8. A hearing device according to claim 1, wherein the hearing device is a headset, one or more earbuds, or a hearing aid.

9. A hearing device according to claim 1, wherein the first radar sensor is configured to emit a radio signal at a frequency of 55 GHz-65 GHz.

10. A hearing device according to claim 1, wherein the first radar sensor is configured to emit a radio signal at a frequency of 50 GHz-100 GHz.

11. A hearing device according to claim 1, wherein the first radar sensor is configured to emit a radio signal at a frequency of 40 GHz-120 GHz.

12. A hearing device according to claim 5, wherein the processing unit is further configured to:
perform a calibration process, based on the determined shape of the first pinna.

13. A hearing device according to claim 4,
wherein the hearing device further comprises:
a second housing configured to be worn at and/or in a second ear of a user, and
a second radar sensor connected to the second housing and configured to obtain second radar data indicative of a second pinna of the second ear, and
wherein the processing unit is further configured to:
receive the second radar data from the second radar sensor, and
determine, based on the received second radar data, a shape of the second pinna.

\* \* \* \* \*